(12) United States Patent
Jeannin et al.

(10) Patent No.: US 11,899,094 B2
(45) Date of Patent: Feb. 13, 2024

(54) COMPRESSIVE MULTIPLEXING FOR RADAR DATA

(71) Applicant: Infineon Technologies AG, Neubiberg (DE)

(72) Inventors: Mayeul Jeannin, Munich (DE); Farhan Bin Khalid, Munich (DE); Dian Tresna Nugraha, Bandung (ID); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 101 days.

(21) Appl. No.: 17/587,286

(22) Filed: Jan. 28, 2022

(65) Prior Publication Data
US 2023/0243951 A1 Aug. 3, 2023

(51) Int. Cl.
*G01S 13/58* (2006.01)
(52) U.S. Cl.
CPC ................... *G01S 13/58* (2013.01)
(58) Field of Classification Search
CPC ........................................... G01S 13/58
USPC ............ 342/22, 70, 457, 175, 368, 118, 352
See application file for complete search history.

(56) References Cited

U.S. PATENT DOCUMENTS

| 20,190,317 | 10/2019 | Meissner et al. | |
|---|---|---|---|
| 2019/0317205 A1 * | 10/2019 | Meissner | H03M 7/3059 |

OTHER PUBLICATIONS

A. Santra et al., Ambiguity function and imaging performance of coded FMCW waveforms with fast 4D receiver processing in MIMO radar, Digit. Signal Process. (2019), https://doi.org/10.1016/j.dsp.2019.102618. Published in 2019.
Touati et al. "High Angle Resolution Automotive Radar Based on Simultaneous 12Tx Doppler-Multiplex MIMO" IEEE Proceedings of the 17th European Radar Conference, published Jan. 13, 2021.
Texas Instruments "Memory Compression and Decompression Engine for TI mmWave Radar" Published Dec. 2019.

\* cited by examiner

*Primary Examiner* — Bo Fan
(74) *Attorney, Agent, or Firm* — Eschweiler & Potashnik, LLC

(57) ABSTRACT

Systems, methods, and circuitries are disclosed for compressing radar data. In one example, a method includes storing radar data in a memory, the radar data being stored in a data cube having a slow-time dimension, a fast-time dimension, and a channel dimension. The data cube is divided into one or more zones. For each zone a number of data matrices is selected based on a compression factor. Sets of data matrices containing the number of data matrices are formed and, for each set of data matrices, for each data matrix, the data vectors are coded to generate a coded data matrix. A coding for data vectors in a data matrix is the same and a coding for different data matrices is different. The coded data matrices are combined to generate a compressed data matrix for the zone and the compressed data matrices for the one or more zones are stored.

20 Claims, 7 Drawing Sheets

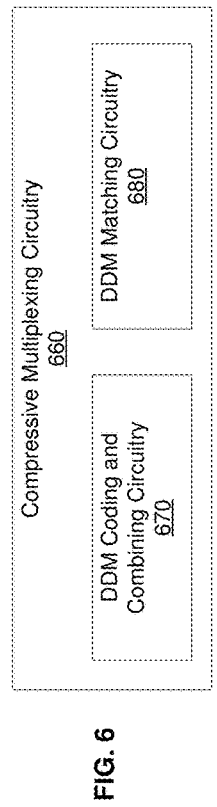
FIG. 6
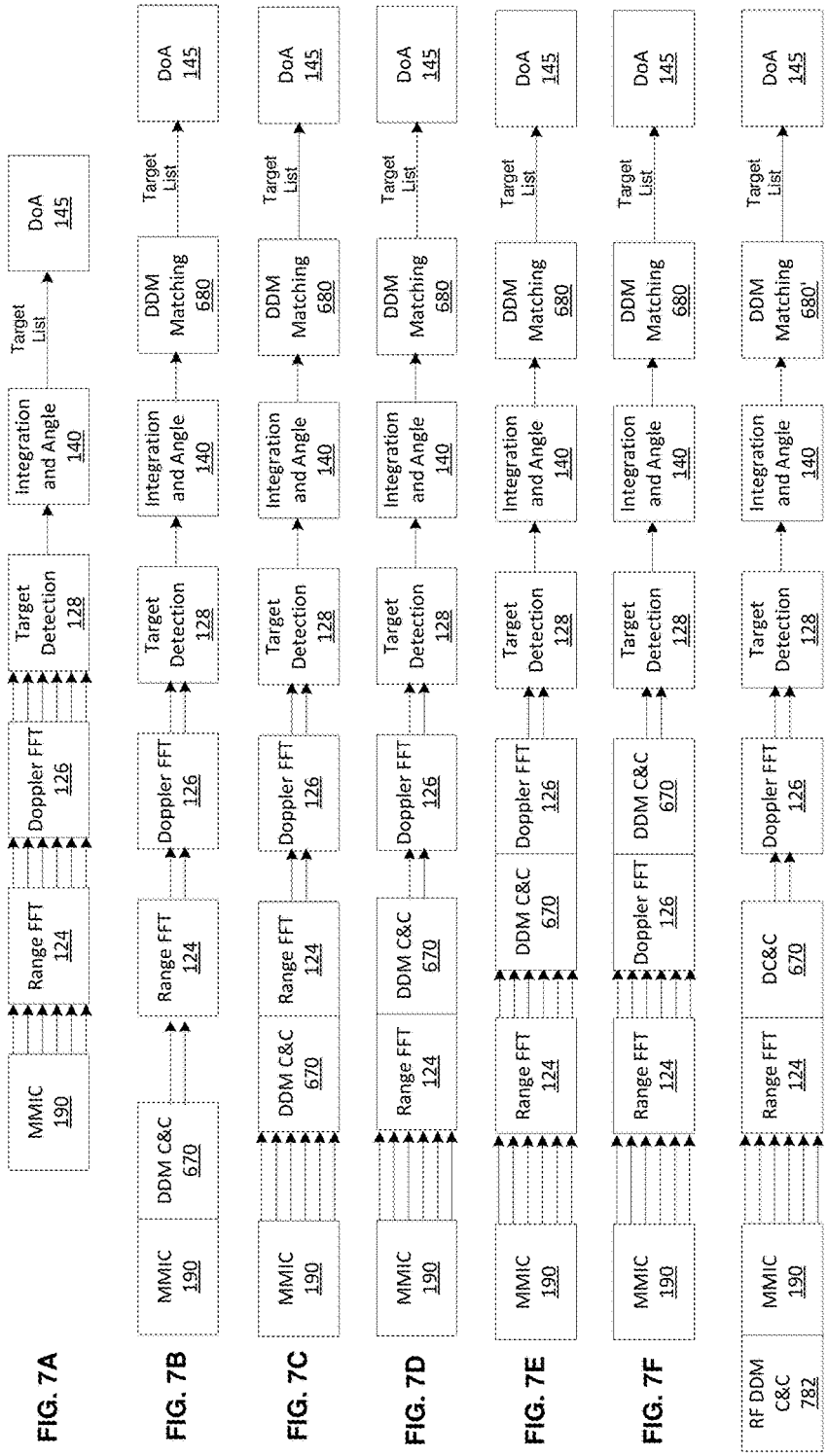
FIG. 7A
FIG. 7B
FIG. 7C
FIG. 7D
FIG. 7E
FIG. 7F
FIG. 7G

COMPRESSIVE MULTIPLEXING FOR RADAR DATA

FIELD

The present disclosure relates to the field of radar circuits and in particular to methods, systems, and circuitry for using radar signals for detecting objects.

BACKGROUND

Radio frequency (RF) transceivers can be found in numerous applications, particularly in the field of wireless communications and radar sensors. In the automotive sector there is an increasing demand for radar sensors for use in detecting vehicles and other objects near a sensor-equipped vehicle.

BRIEF DESCRIPTION OF THE DRAWINGS

Some examples of circuits, apparatuses and/or methods will be described in the following by way of example only. In this context, reference will be made to the accompanying Figures.

FIG. 6 illustrates an example compressive multiplexing circuitry, in accordance with various aspects described.

FIGS. 7A-7G illustrate example radar systems that includes compressive multiplexing circuitry, in accordance with various aspects described.

DETAILED DESCRIPTION

Figure 1:
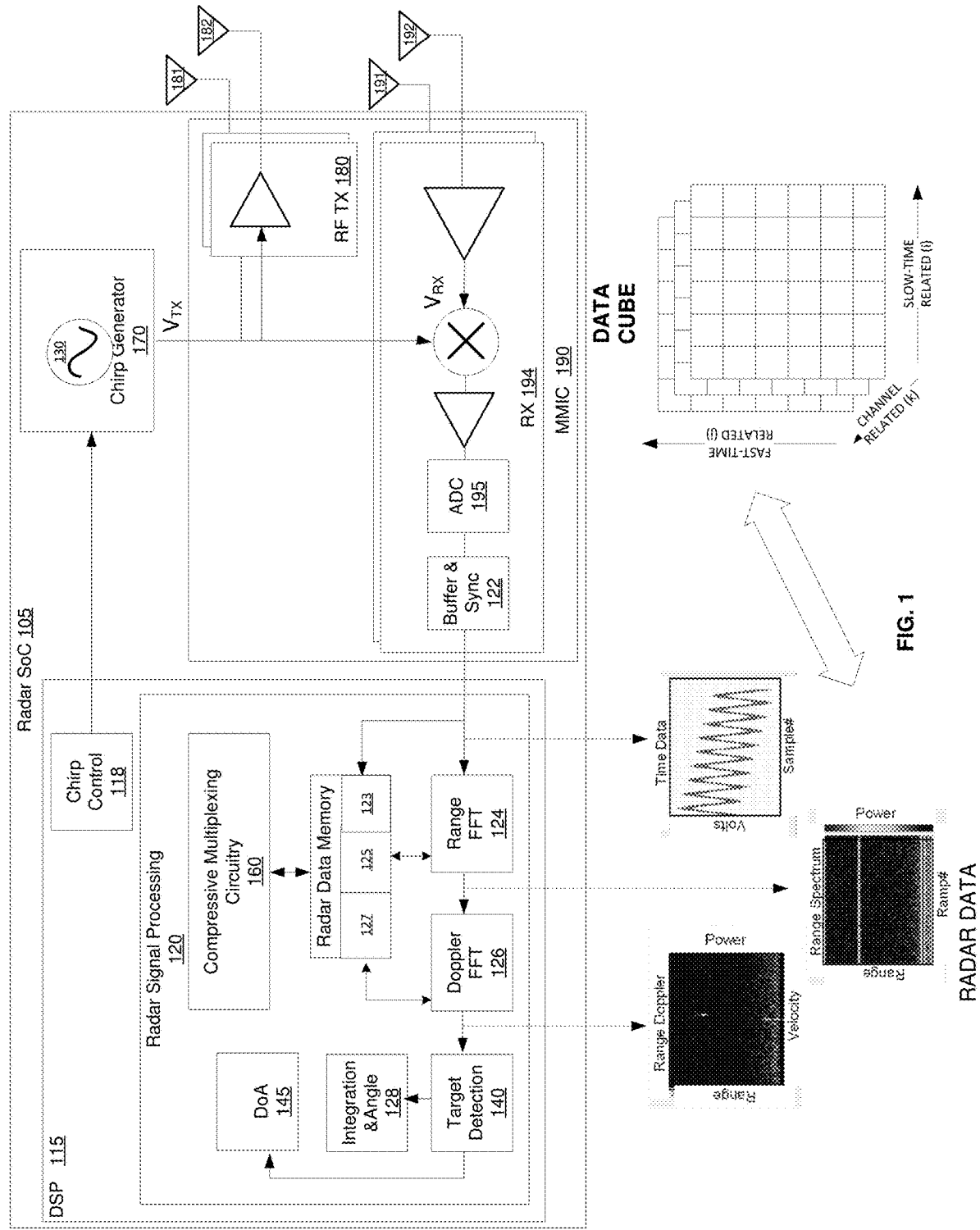
FIG. 1 illustrates an example radar system on chip (SoC), in accordance with various aspects described.

Throughout this description, components that are exemplary versions of a same or analogous component are assigned reference characters having the same value for the last two digits while the initial digit(s) of reference characters are assigned based on the FIG. number in which they are first introduced.

FIG. 1 illustrates an example radar data processing system on chip (SoC) 105. The SoC 105 includes digital signal processing (DSP)) circuitry 115, analog chirp generator circuitry 170, one or more transmit chains 180, one or more receive chains 194, one or more transmit antennas 181, 182, and one or more receive antennas 191, 192. In some examples a transmit chain and receive chain pair may be implemented in an associated monolithic microwave integrated circuit (MMIC) 190. The DSP includes chirp control circuitry 118 that controls an oscillator-based chirp generator circuitry 170 to generate a chirp signal at an operating frequency. The chirp signal is amplified by a power amplifier (PA) in each transmit chain 180 and broadcast by a corresponding antenna 181, 182.

Each receive chain 194 is coupled to a corresponding antenna 191 or 192 that receives a radar signal that includes echoes (reflections of the transmitted chirp signal). The received radar signal is amplified by a low noise amplifier (LNA) and combined by a mixer with the chirp signal. The mixing process generates a signal having a phase equal to a difference in phase between the transmit and receive signals (called the beat frequency signal). A filtered beat frequency signal is then converted to a digital signal (e.g., radar data) by analog-to-digital converter (ADC) 195 provided to buffer and synchronization circuitry 122 that collects time-domain radar signal amplitude data, which may be signed and complex valued, from the receive chain and synchronizes it for processing. The example time-domain radar signal amplitude data illustrated in FIG. 1 illustrates real-only samples from multiple receive chains, overlaid, for a single frequency modulated continuous wave (FMCW) ramp. There are multiple successive ramps in one FMCW chirp-sequence. This radar data generated by the MMIC 190 is stored in a first radar data memory 123.

Range FFT circuitry 124 obtains range spectrum data by performing a discrete Fourier transform (DFT) on the time-domain radar amplitude data along the samples dimension. The resulting frequency data represents the range (e.g., radial distance in front of the antennas) of targets, with usually negligible range shift influenced by a target's velocity. The range spectrum data is complex valued since it is the output of a DFT function and may also be signed. An example of range spectrum data is shown in FIG. 1. The radar data generated by the range FFT circuitry 124 is stored in a second radar data memory 125.

Doppler FFT circuitry 126 obtains range Doppler spectrum data by performing a DFT on the range spectrum data along the ramp dimension. The resulting frequency data represents the velocity of targets. The range Doppler data is complex valued and may also be signed. An example of range Doppler spectrum data is shown in FIG. 1. The radar data generated by the Doppler FFT circuitry 126 is stored in a third radar data memory 127.

The first, second, and third radar data memories 123, 125, 127 may be implemented as an allocated portion of a larger memory, which may be integral with or external to the radar signal processing circuitry 120. The first, second, and third radar data memories 123, 125, 127 may be separately allocated or may share memory allocation such that the radar data generated by a subsequent processing step at least partially overwrites the radar data generated by a previous processing step. While the radar data memories may not be depicted in all figures or described with respect to all processing steps, it is to be understood that the radar data generated by each processing step is stored in radar data memory for access by subsequent processing steps and/or transmission to external processing circuitry, like a control module (not shown).

The range Doppler data is provided to target detection circuitry 128 which performs non-coherent integration on the range Doppler data from the different receive chains 190 and detects peaks in the range Doppler data using an algorithm, such as constant false alarm rate (CFAR), to detect targets. This detected target information may be one output of the radar SoC 105. The detected target information may be provided to direction of arrival (DoA) circuitry 145 which determines the direction of arrival for each detected target.

Integration and angle circuitry 140 may analyze the peaks detected by the target detection circuitry to determine a spatial angle and direction of the targets. The output of the integration and angle circuitry 140 is range angle azimuth spectrum data and/or range elevation spectrum data.

Several specific processing units (122, 124, 126, 128, 140, 145, 190) have been described with respect to the processing of radar signals. This is just one possible configuration for the radar signal processing circuitry 120. For the purposes of this disclosure, the output of the MMIC 190 (time-domain radar signal amplitude data), the output of the range FFT circuitry 124 (range spectrum data), and the output of the Doppler FFT circuitry 126 (range Doppler spectrum data) are each examples of "radar data" which is to be generally construed as including any data that results from processing of a received radar signal. Thus, if different processing steps or units are included in the radar signal processing circuitry 120, radar data includes intermediate outputs of or data generated by the different processing steps.

As an example, radar data may be signed, complex data represented as real and complex values on a Cartesian plane that are stored in two adjacent words. A radar data sample may be a 32-bit complex integer with 2 16 bit sub-integers, one describing a real-part and one describing the complex part. In other examples, radar data may be an amplitude value and phase value pair.

Throughout the various steps of radar data processing, the radar data may be conceptualized as being stored and/or transmitted as a data cube having a slow time related dimension (i.e., related to individual ramps), a fast time related dimension (i.e., related to value of reflected signal during a single ramp), and a channel related dimension (i.e., related to antenna elements). The data cube contains, in respective bins, all radar data samples that are jointly processed to determine a distance, a radial velocity, and/or a direction of arrival of a radar-reflecting object within the field of view of the radar device.

For each ramp and channel, multiple samples of the received radar signal are recorded at the sample rate. Received radar signals for multiple ramps are processed and each ramp is represented by a two-dimensional array of per-ramp radar data samples which are ordered along the slow time related dimension. The subsequently reordered radar data samples per channel and ramp are ordered along the fast time related dimension. Likewise, the radar data samples recorded for different channels are ordered along the channel related dimension.

A single radar data sample stored within the data cube can therefore be identified by a bin having three indices, an index i for the slow-time related (ramp) dimension, an index j for the number of the sample within a sequence of samples recorded for a ramp (the fast-time related dimension), and an index k for the channel related dimension. The triplet of indices i,j,k are also referred to herein as a data bin that uniquely identifies a radar data sample. Whenever a radar signal (e.g., echo) is received, the bins contain information on all targets producing a received echo. For the purposes of this discussion, the term bin will be used to refer to a data sample stored within the bin.

In other words, as illustrated in FIG. 1, radar data samples can be organized in bins of a data cube, which represents the radar data in three-dimensions. The fast-time dimension includes bins for each data sample in a ramp. In some radar systems, there are between 512-2048 bins in this dimension. The slow time dimension includes bins for each ramp in the sequence. In some radar systems, there are between 64-512 bins in this dimension. The channel dimension includes a bin for each channel. The number of channels is determined based on the number of transmit antennas that are simultaneously transmitting and the number of receive transmitters. In some radar systems there are between 4-16 bins in the channel dimension.

As the space-time-based radar data is transformed to the frequency domain by the successive FFT and DoA operations, the time-related dimensions of the data cube also transform. The slow-time related dimension becomes a velocity related dimension in which different positions along this dimension represent different velocities relative to the radar device. The fast-time related dimension becomes a range related dimension in which different positions along this dimension represent different distances relative to the radar device. The channel dimension is also transformed from the space dimension to the frequency dimension. Because the compressive multiplexed techniques described herein are equally applicable to a data cube at any stage of radar data processing, for the purposes of this description, the term "slow-time related dimension" will be used to also encompass velocity related dimensions of the data cube. The term "fast-time related dimension" will be used to also encompass range related dimensions of the data cube.

Figure 2:
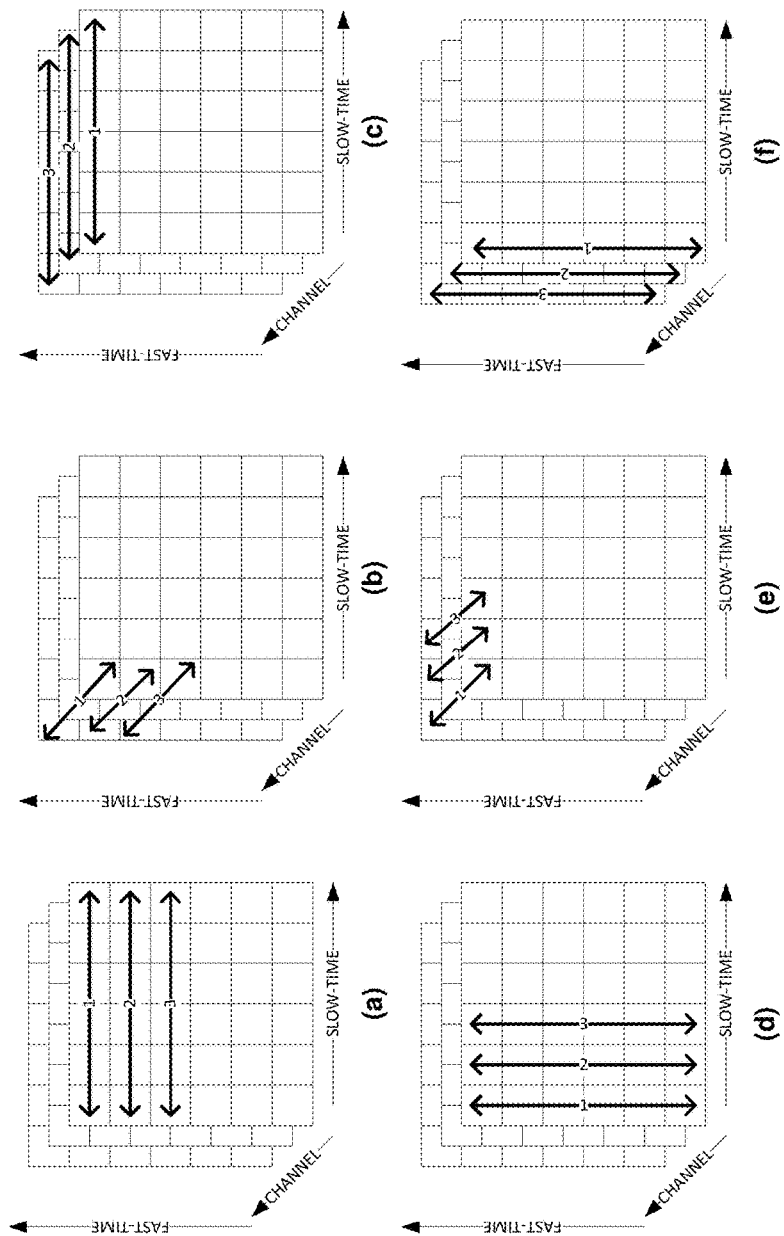
FIG. 2 illustrates exemplary data cubes with data vectors for organizing radar data.

FIG. 2 illustrates a concept of "data vectors" within a data cube. A data vector is a set of bins from within the data cube in which each bin shares a same exact index value with other bins in the data vector along two of the three dimensions. For example, the bins in each of the data vectors 1, 2, and 3 of (a) share a same fast-time index value and channel index value. The bins in each of the data vectors 1, 2, and 3 of (b) share a same fast-time index value and slow-time index value. The bins in each of the data vectors 1, 2, and 3 of (c) share a same fast-time index value and channel index value. The bins in each of the data vectors 1, 2, and 3 of (d) share a same slow-time index value and channel index value. The bins in each of the data vectors 1, 2, and 3 of (e) share a same slow-time index value and fast-time index value. The bins in each of the data vectors 1, 2, and 3 of (f) share a same slow-time index value and channel index value. A set of data vectors that consist of bins sharing a single index value are referred to herein as a data matrix. A data matrix is a "slice" of a data cube taken across the cube on the dimension of the common index.

As vehicles incorporate more radar based features such as obstacle detection and driver assistance, target detection algorithms are becoming more elaborate and demand increased amounts of data to provide desired resolution and accuracy. Performing the target detection algorithms places significant burden on a processor in a radar SoC. Rather than increasing the processing power for each radar SoC on a vehicle to support processing-intensive target detection algorithms, it may be beneficial to compress radar data during intermediate processing on the radar SoC and/or to transmit compressed radar data to a central processing unit on a vehicle.

Radar data is known to be sparse and is a superposition of sinusoids in Doppler and angle dimension. This allows for data compression using several techniques including datatype compression, word compression, and sparse compression. Data may be compressed for transmission by RF modulation of the radar signals for simultaneous transmission. Word compression or datatype compression may be performed during radar data processing. In some techniques, the sparsity property of radar data is leveraged to compress radar data by randomly deleting samples.

Word compression is not ideal for radar data processing in the sense that a word represents a sequence of consecutive bins in a particular dimension of a data cube. Transpose reading in word compression imposes the restriction that a full word must be decompressed to get a particular bin of the word. Data type compression may be performed by type casting each radar data cube bin into a smaller data type (e.g., 32 bit to 16 bit). This type of compression is well suited for radar data compression. Some more advanced types of data type compression are being performed on radar data including techniques that minimize scaling effect such as HPFP (or FP16) IEEE 754. Sparsity compression at the radar data is a good comprise between compression performance and radar processing fit. It is to be understood that the compressive multiplexing techniques described herein may be performed instead of or in addition to any other compression techniques such as those just discussed.

Described herein are methods, systems, and circuitries that support compressive multiplexing (and/or decompressive de-multiplexing) of radar data to reduce the storage necessary to store a data cube during radar data processing. The compressive multiplexing techniques uniquely code each data vector in a set of data vectors being compressed and then combine the coded data vectors to generate a compressed data vector that consumes less storage (e.g., data bits) than would be required to store the data vectors separately.

Referring back to FIG. 1, the illustrated SoC includes compressive multiplexing circuitry 160 that is configured to perform compressive multiplexing on a data cube at a selected step in the radar data processing flow and to perform an inverse decompressive de-multiplexing operation on the compressed data cube at a subsequent step in the radar data processing flow. While the entirety of the compressive multiplexing circuitry 160 is illustrated as being contained on the radar SoC 105, it is to be appreciated that the hardware/software components performing the compressive multiplexing and may be performed at an MMIC level (not shown) or on a separate SoC from the hardware/software components performing the decompressive de-multiplexing operations.

Figure 3:
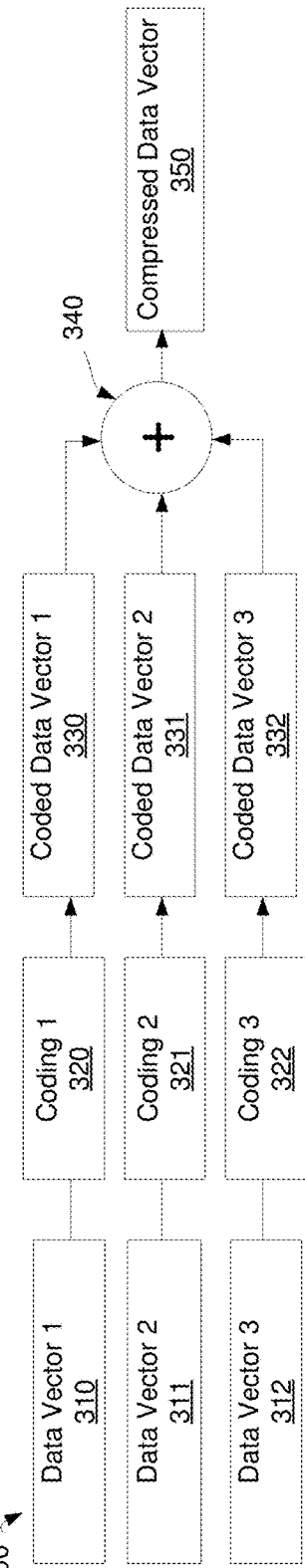
FIG. 3 illustrates an example compressive multiplexing technique, in accordance with various aspects described.

FIG. 3 is a functional diagram outlining an example of compressive multiplexing 300. A data cube dimension along which to compress is selected. A set of two or more data vectors that have a different index value for that dimension are selected. In some examples each data vector being coded includes the same number of bins. The number of data vectors that are selected for compression determines the compression factor that will be achieved by the compressive multiplexing. In FIG. 3, three data vectors 310,311,312 are selected for compression so the compression factor is 3. Each of the data vectors is coded by a unique coding 320, 321, 322 to generate respective coded data vectors 330,331, 332. Other numbers of data vectors may be compressively multiplexed.

During the coding process, unique coding is performed on data in each bin of the data vector. The modified data samples in a data vector form a corresponding coded data vector. Any coding technique that is used for code division multiplexing of RF signals may be used for coding radar data samples for compressive multiplexing. Examples of codes include Doppler, Hadamard, PRPM, Costas, Golay, Frank, Zadoff Chu, space-time codes, and so on.

The coded data vectors are multiplexed or combined in one dimension by combination circuitry 340 to generate a compressed data vector 350. During the multiplexing operation, the coded data vectors are coherently combined, meaning that the coded data vectors are aligned by index number in the dimensions in which the data vectors shared index values and then the coded data sample in a data vector is combined with its corresponding coded data samples in the other coded data vectors. The combined coded data samples together form a compressed data vector. For example, coded data vectors from different channels may be combined to form a single data vector in which the bins having identical fast time and slow time indices but different channel indices are combined. When the data vectors 310,311,312 have the same number of radar data samples, the compressed data vector 350 may have the same number of combined coded data samples as one of the original data vectors.

The simple example illustrated in FIG. 3 may be extended to cover the unique coding of subsets of data vectors that make up data matrices. Recall that a data matrix is a set of data vectors that includes bins having a single common index value and corresponds to a slice of a data cube taken along the dimension of the common value. In this case, data vectors in each data matrix are each subjected to the same unique coding, with the coding being different as between data matrices. For example, when the data matrices are slices of the data cube each representing data vectors for a different channel, the data vectors in each channel are subjected to the same unique coding and then the resulting coded matrices are combined in the channel dimension, so that the size of the channel dimension in the compressed data cube becomes one instead of three.

The use of Doppler coding provides some benefits when coding radar data samples due to the nature of the radar data samples as will be discussed below. When a data vector is coded using a Doppler division multiplexing (DDM) coding, each radar data sample in the data vector undergoes a complex rotation without amplitude change. When the radar data samples are real and complex coordinates, the operation is executed as a complex multiplication in which both the real and complex parts of the data sample are multiplied by the same complex tone (e.g., 180 degrees). This has the effect of a spectrum shift in the frequency domain proportional to the tone. Applying this type of modulation on the frequency domain results in a simple circular shift of the radar data vector.

Figure 4A:
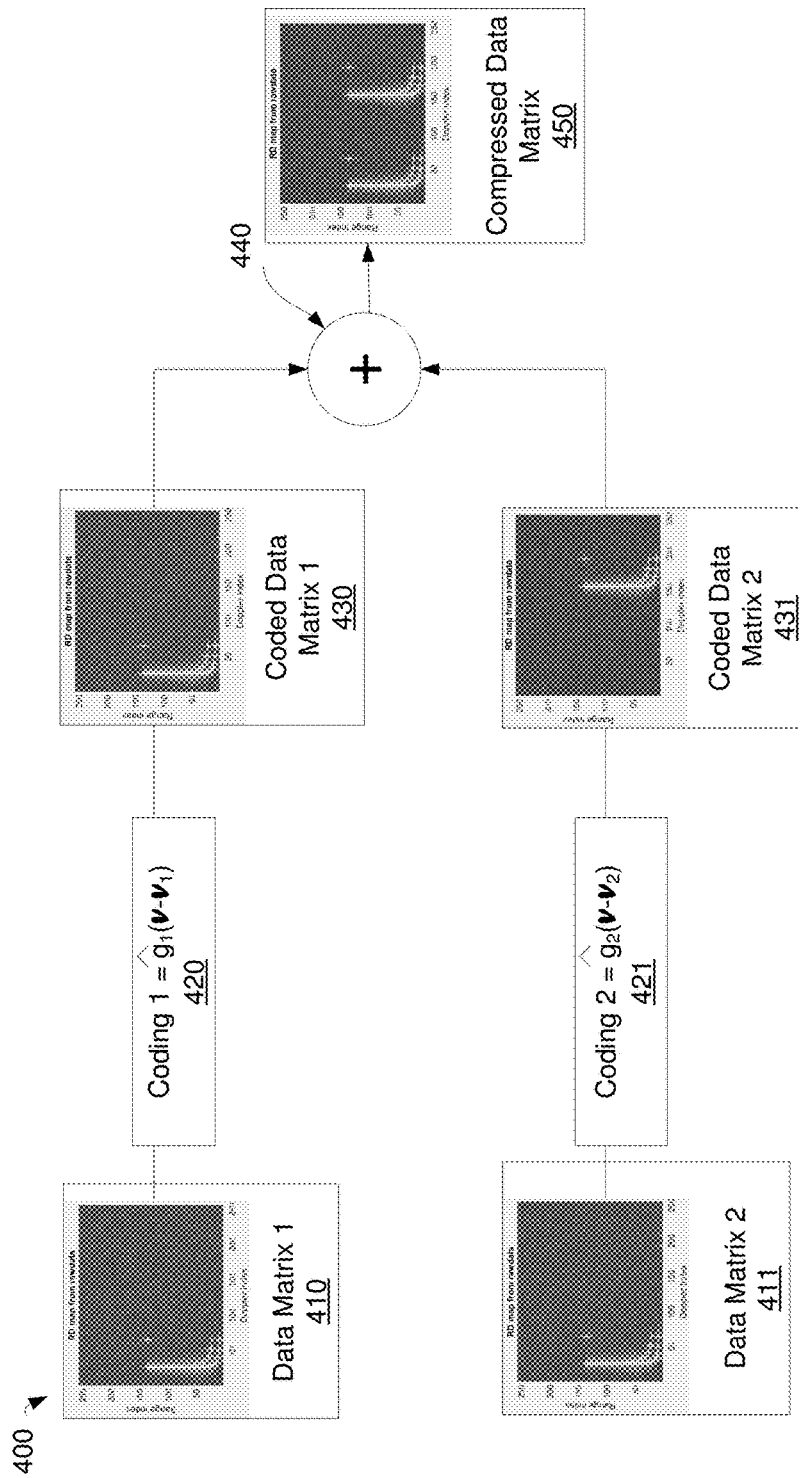
FIG. 4A illustrates an example a compressive multiplexing technique, in accordance with various aspects described.

Referring to FIG. 4A, a simple example of compressive multiplexing 400 using DDM coding is illustrated. A first data matrix 410 includes a "slice" of a data cube including a first set of data vectors that are aligned in one dimension. A second data matrix 411 includes a second set of data vectors that are aligned in the same dimension as the first set. In other words, the two data matrices 410,411 have corresponding same slow-time dimension indexes and fast-time dimension indexes but have different channel indexes. Each data vector in the first data matrix is subjected to a first coding 420 and each data vector in the second data matrix is subjected to a second coding 421, which is different from the first coding 420. The first coding involves a unique (with respect to the second coding) frequency shift of $v_1$ while the second coding involves a unique (with respect to the first coding) frequency shift of $v_2$. The coding of the first data matrix 410 generates coded data matrix 430 while the coding of the second data matrix 411 generates the coded data matrix 431. In the illustrated example $v_1$ is 0 Doppler bins (i.e., bins in the slow time dimension) and $v_2$ is 128 Doppler bins (corresponding to half the Doppler space).

The combination circuitry 440 combines coded data matrix 430 and coded data matrix 431 to generate compressed data matrix 450. It can be seen that in the compressed data matrix 450 the target related information from data matrix 411 is present in the compressed data matrix 450 but instead of overlaying the target related information of data matrix 410, the target related information from data matrix 411 is position shifted by 128 Doppler bins (half the Doppler space) from the target related information from data matrix 410.

Figure 4B:
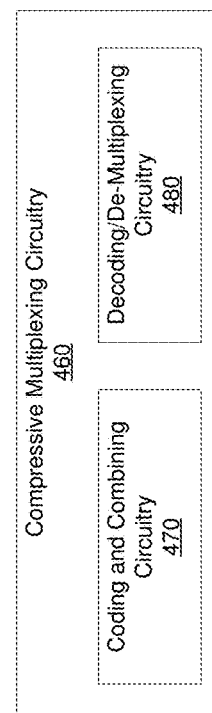
FIG. 4B illustrates an example compressive multiplexing circuitry, in accordance with various aspects described.

FIG. 4B illustrates an example compressive multiplexing circuitry 460. The circuitry 460 includes coding and combining circuitry 470 and decoding/de-multiplexing circuitry 480. The coding and combining circuitry 470 is disposed at a particular point in radar data processing (see, e.g., a selected processing step of FIG. 1) to compressively multiplex the radar data cube. The decoding/de-multiplexing circuitry 480 is disposed at a later point in the radar data processing. Thus, the data cube is compressed (e.g., requires less memory to store than the original data cube) during any radar data processing that occurs between the coding and combining circuitry 470 and the decoding/de-multiplexing circuitry 480. In some examples, the decoding/de-multiplexing circuitry 480 is disposed in a component that is external to the SoC that contains the coding and combining circuitry 470. In these examples, the compressively multiplexed data cube is transmitted from the SoC that contains the coding and combining circuitry 470 to the component (e.g., a central radar processing unit) that contains the decoding/de-multiplexing circuitry 480. The compression of the data cube before transmission reduces the bandwidth needed to transmit the compressed data cube to the decoding/de-multiplexing circuitry 480.

The operations just described with respect to FIGS. 3 and 4A are performed by the coding and combining circuitry 470. The decoding/de-multiplexing circuitry 480 performs operations to interpret the compressed data based on the coding technique used for the data vectors by the coding and combining circuitry 470. Referring back to the example of FIG. 4A, in the case of DDM coding, the decoding/de-multiplexing circuitry 480 detects peaks in the compressed data matrix 450 and then, based on knowledge of the frequency shift applied to the different data vectors in data matrices 410 411, matches peaks separated by the frequency shift as being associated with the same targets but from a different channel. Thus, since the two peaks shown in the compressed data matrix 450 are separated by the difference in the frequency shifts $v_1$ and $v_2$, these peaks are interpreted, by the decoding/de-multiplexing circuitry 480 as being associated with the same targets.

The compression factor achieved by compressive multiplexing is determined by selecting a number N of data vectors that will be multiplexed. The compression factor is further controlled by selecting datatype size (D) of the compressed data vector. Thus, the compression factor Z may be expressed as shown in EQ. 1.

$$Z = N \cdot \frac{D_{input}}{D_{output}} \qquad \text{EQ. 1}$$

For example, multiplexing 3 data vectors with a datatype size of 16-bit complex together on an output of 32 bit complex would give a compression factor of 1.5.

Figure 5:
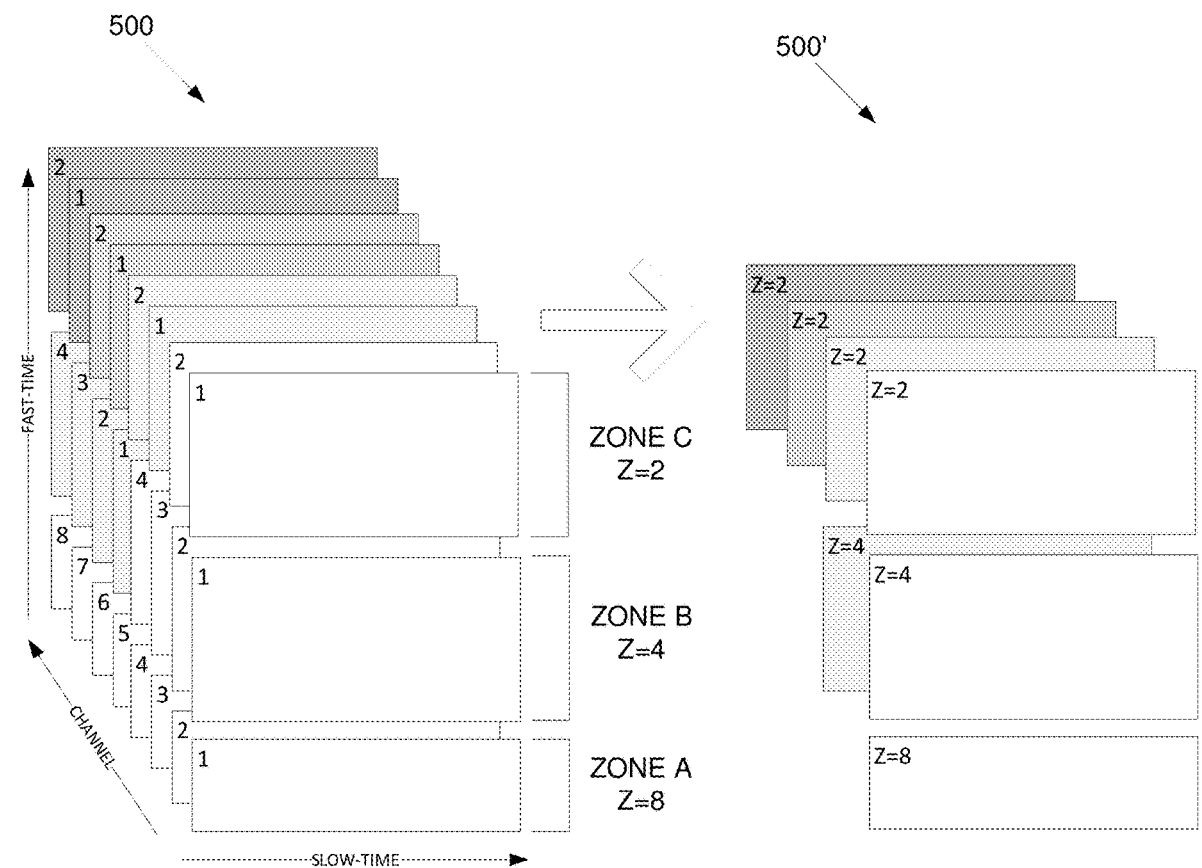
FIG. 5 illustrates an example compressive multiplexing technique performed on a per-zone basis, in accordance with various aspects described

FIG. 5 illustrates an example of compressive multiplexing in which different zones of a data cube 500 are compressively multiplexed in the channel dimension to different degrees of compression to generate a compressed data cube 500' that requires less memory to store. The data cube 500 includes 8 data matrices that, respectively, include data vectors for one channel. The data cube is divided into three zones A, B, C along the fast time dimension, resulting in the data matrices indicated by the individual slices shown in FIG. 5. A different compression level is applied to each zone. Zone A is half the size in the fast-time dimension as compared to zones B and C. The data cube 500 is compressed in the channel dimension to varying degrees as follows.

In the illustrated example, in zone A all 8 channels are compressed so that in the compressed data cube 500' the channel dimension is one. In the compressive multiplexing operation on zone A, the data vectors for each of the eight channels are subjected to a distinct coding, meaning that 8 distinct codes (e.g., Doppler frequency shifts) are used as indicated by the unique numbers 1-8 in the data matrices of zone A. In zone B 4 channels are compressed so that in the compressed data cube 500' the channel dimension is two. In the compressive multiplexing operation on zone B, the data vectors for each group of 4 channels are subjected to a distinct coding, meaning that 4 distinct codes (e.g., Doppler frequency shifts) are used as indicated by the repetition of numbers 1-4 in the data matrices of zone B. In zone C 2 channels are compressed so that in the compressed data cube 500' the channel dimension is four. In the compressive multiplexing operation on zone C, the data vectors for each group of 2 channels are subjected to a distinct coding, meaning that 2 distinct codes (e.g., Doppler frequency shifts) are used as indicated by the repetition of numbers 1-2 in the data matrices of zone A.

The zone and compression scheme illustrated in FIG. 5 is well suited for compressing radar data because the probability of losing weaker targets in compression (e.g., zone C) is higher than the probability of losing closer targets. Thus it may be beneficial to apply more compression to the data vectors in zone A while using less compression in zones B and C. The compression factor Z for the data cube 500' is $Z=1/(\frac{1}{5}*\frac{1}{8}+\frac{2}{5}*\frac{1}{4}+\frac{2}{5}*\frac{1}{2})$ or 3.07. Compressed data cube 500' consumes less than a third of the amount of memory space needed to store data cube 500.

While a particular division of a data cube into zones along the fast time dimension and combining in the channel dimension is illustrated in FIG. 5, it is to be understood that the data cube may be divided into zones in any dimension and combined in any dimension as well.

FIGS. 6 and 7 illustrate DDM based compressive multiplexing. Radar data often represents received echoes of DDM coded RF signals simultaneously transmitted by multiple transmit antennas. The same type of DDM coding can be applied to the radar data after reception either on time or frequency domain at any step in the radar data processing and the intermediate processing steps can function without modification. FIG. 6 illustrates one example of compressive multiplexing circuitry 660 used to perform DDM based compressive multiplexing. The circuitry 660 includes DDM coding and combining circuitry 670 which performs operations generally described with respect to circuitry 470 of FIG. 4B (e.g., Doppler shifting and combining) and DDM matching circuitry 680 which performs operations generally described with respect to the decoding/de-multiplexing circuitry 480 of FIG. 4B (e.g., peak identification and matching).

FIGS. 7B-7F illustrate several examples of positioning of the coding and combining circuitry 670 and DDM matching circuitry 680 within the radar processing steps outlined in FIG. 7A (see also description of FIG. 1). In all of the positioning options, the DDM matching circuitry 680 is positioned after target detection and prior to direction of arrival processing 145. This allows each peak to be assigned to the appropriate channel. As shown in FIG. 7B, in one example, the DDM coding and combining circuitry 670 may compress a data cube that was stored by MMIC 190 prior to the data cube being provided to range FFT circuitry 124. As shown in FIG. 7C, in one example, the DDM coding and combining circuitry 670 may compress a data cube that was received by range FFT circuitry 124 from MMIC 190 such that the data cube is compressed prior to operation on the data cube by the range FFT circuitry 124. As shown in FIG. 7D, in one example, the DDM coding and combining circuitry 670 may compress a data cube that was stored by range FFT circuitry 124 prior to the data cube being provided to Doppler FFT circuitry 126. As shown in FIG. 7E, in one example, the DDM coding and combining circuitry 670 may compress a data cube that was received by Doppler FFT circuitry 126 from range FFT circuitry 124 such that the data cube is compressed prior to operation on the data cube by the Doppler FFT circuitry 126. As shown in FIG. 7F, in one example, the DDM coding and combining circuitry 670 may compress a data cube that was stored by Doppler FFT circuitry 126 prior to the data cube being provided to integration and angle circuitry 140.

FIG. 7G illustrates an example in which DDM coding and multiplexing of the transmit RF signals are performed by RF DDM coding and combining circuitry 782 and then the received radar data is DDM coded and multiplexed after operations by the range FFT circuitry 124. A single DDM matching circuitry 680' circuitry can de-multiplex the compressed data cube into original data vectors and can also separate out components of each data vector that were transmitted and received by different combinations of Tx and Rx antennas. This is because the coding and multiplexing method used for the RF transmit signal is compatible with the coding and multiplexing method used to compress the data cube.

By way of example, in a particular radar processing system, with 4 transmit antennas and 3 receive channels using time division multiplexing, there are 256 bins in the slow time dimension with 1024 samples per ramp and 512 bins in the fast-time dimension after range FFT processing. The radar data samples are 16 bit complex (32 bit total per sample). The resulting data cube consumes 6 MB RAM. If the channel dimension is divided into four groups of three channels each and the resulting groups are compressively multiplexed, then the resulting data cube consumes 2 MB RAM.

Figure 8:
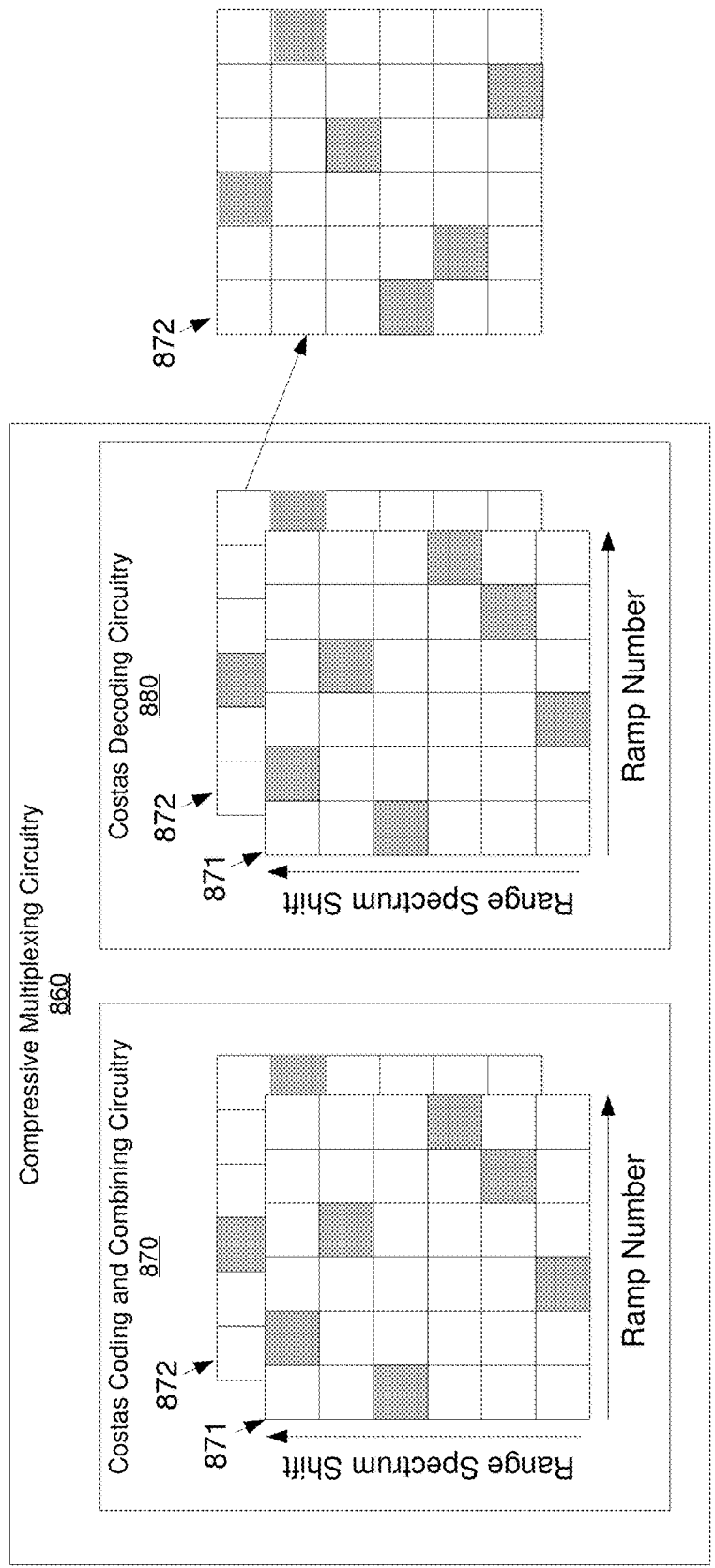
FIG. 8 illustrates an example compressive multiplexing circuitry, in accordance with various aspects described.

FIG. 8 illustrates an example of Costas code based compressive multiplexing circuitry 860 that includes Costas coding and combining circuitry 870 and Costas decoding circuitry 880. Costas coding is a variation of DDM coding where a shift is applied in the range dimension instead of the Doppler dimension. The Costas coding and combining circuitry 870 performs a unique Costas coding on data vectors in each of two or more data matrices and then combines the coded data matrices to generate a compressed data matrix. The resulting compressed matrices may be combined to generate a compressed data cube as shown in FIG. 5.

As shown in the Costas code matrices in the circuitries 870 and 880, the Costas code can be represented by a matrix that indicates for each ramp number in the slow time dimension, a prescribed range spectrum shift. The Costas code is illustrated in FIG. 8 as a matrix with shading to show a selected shift for each ramp, however the Costas code may be stored as a series of values indicating the prescribed range spectrum shift for each respective ramp. Further, while the Costas code shown is for use with six ramps, in practical applications, many more ramps (and columns in the Costas code) would be used. For each data matrix to be coded, the Costas coding and combining circuitry 870 and the Costas decoding circuitry 880 use a different Costas code 871, 872, and so on if necessary. The different Costas codes are distinct and may be completely non-overlapping and any point (i.e., Costas-Sudoku array).

To code a data matrix, the Costas coding and combining circuitry 870 applies a different range spectrum shift to each ramp data vector. For example, in FIG. 8, the Costas code includes six possible range spectrum shifts, in which the lowest value on the range spectrum shift axis indicates no shift, the next value up on the range spectrum shift axis indicates a shift of ⅙ the total number of bins in a data vector. After each data vector in a first data matrix is shifted using the first Costas code 871, a second data matrix (e.g., from a different channel) is coded using a second Costas code 872 in the same manner. Then the first coded data matrix and the second coded data matrix are combined to generate a compressed data matrix. The compressed data matrix is stored or transmitted for access by the Costas decoding circuitry 880. This arrangement may be useful if the data is being transmitted from the SoC after the Costas coding and combining operation (e.g., between the range FFT and Doppler FFT processing steps).

The Costas decoding circuitry 880 recovers approximate ramp data vectors by inversely shifting each ramp data vector by the different amounts per the known Costas code to realign the ramp data vector prior to the next processing step.

Figure 9:
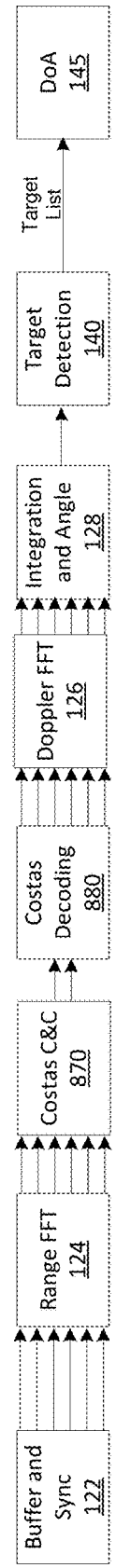
FIG. 9 illustrates an example radar system that includes compressive multiplexing circuitry, in accordance with various aspects described.

The Costas coding and combining circuitry 870 and Costas decoding circuitry 880 are placed adjacent to one another as shown in the example of FIG. 9. In general, the coding and combining circuitry (e.g., 470 of FIG. 4) should be adjacent to decoding/de-multiplexing circuitry (e.g., 480 of FIG. 4). Doppler coding is one exception to this rule due to the special properties discussed above. In other words, care should be taken in the arrangement of RF coding/multiplexing and compressive coding/multiplexing so that one does not interfere with the other. Each decoding operation should be arranged to decode the last coding operation.

Figure 10:
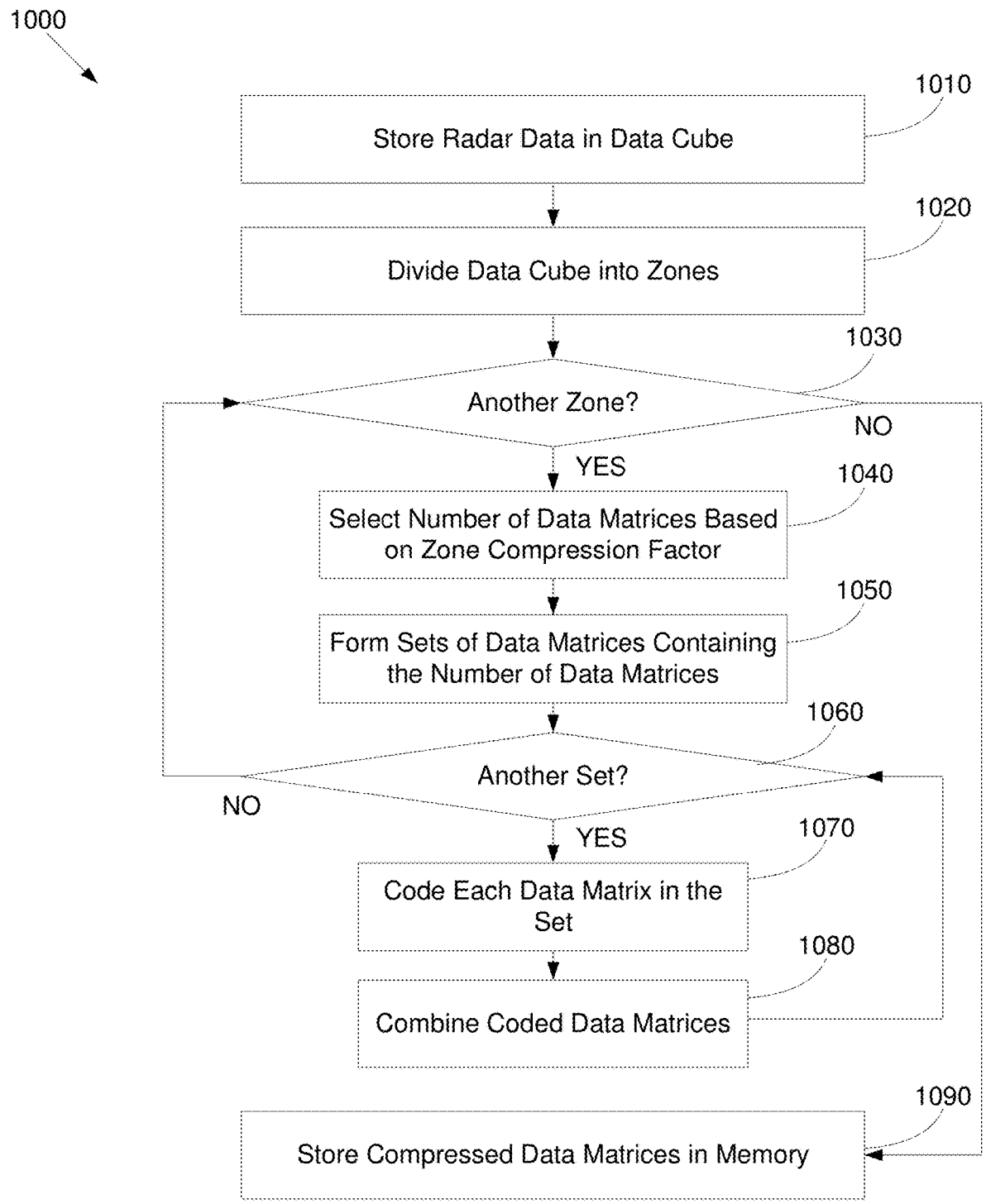
FIG. 10 illustrates an example method for performing compressive multiplexing on a radar data, in accordance with various aspects described.

FIG. 10 illustrates an example method 1000 for compressing radar data. As noted above, radar data is any data that results from processing of a received radar signal and may include time-domain radar amplitude data, range spectrum data, or range Doppler spectrum data, and so on. At 1010, the radar data is stored in a data cube. An example data cube is described in detail with reference to FIG. 1. The data cube has bins distributed in positions described by indices along dimensions including a slow-time dimension, a fast-time dimension, and a channel dimension. The data cube includes a plurality of data vectors, each data vector includes a unique set of bins, wherein bins of a data vectors have different indices in one of the slow-time dimension, the fast-time dimension, and the channel dimension and identical indices in the other two of the slow-time dimension, the fast-time dimension, and the channel dimension. Examples of data vectors are described with reference to FIG. 2.

At 1020 the data cube is divided along a first dimension (e.g., the fast-time dimension in FIG. 5) into one or more zones. At 1030 if no zones remain uncompressed the method is complete and compressed data matrices are stored at 1090. For each uncompressed zone, the method includes, at 1040, selecting a number of data matrices based on a compression factor (e.g., the Z value in FIG. 5). Each data matrix comprises data vectors having bins that share an index value in a second dimension. The number of data matrices selected in each zone is different. For example, referring back to FIG. 5, in zone A 8 data matrices are selected, in zone B 4 four data matrices are selected, and in zone C two data matrices are selected.

At 1050, sets of data matrices from the zone are formed that contain the number of data matrices. Referring back to FIG. 5, the different sets of data matrices in each zone of data cube 500 have different shading. At 1060, if all sets of data matrices in the zone have been coded, the method returns to 1030 to determine if all zones have been processed by the method. If all sets of data matrices in the zone have not been processed, for a next set at 1070 each data matrix in the set is subjected to a coding that is the same for all data vectors in the data matrix but different from coding applied to other data matrices. This difference in coding is reflected in the numbers in the top left corners of the data matrices of FIG. 5. For example, the data vectors in a first data matrix of the set may be subjected to a 0° Doppler shift while the data vectors in a second data matrix of the set may be subjected to a 180° Doppler shift, and so on, with each data matrix being subjected to a different Doppler shift. At 1080 the coded data matrices in the set are combined in the second dimension to generate a compressed data matrix. These compressed data matrices can be seen in 500' with corresponding shading to the data matrices from which they originated. The method returns to 1060 to determine if more sets remain in the zone, if not the method returns to 1030 to determine if any zones remain uncompressed. If all zones have been compressed, the method flows to 1090 and the compressed data matrices are stored in memory (see, e.g., compressed data cube 500' of FIG. 5).

In some examples, the method 1000 includes receiving a radar signal on at least one receive channel and processing the received signal to generate radar data (e.g., by filtering and converting the received analog signal to digital samples).

As noted above, examples of coding techniques that can be applied at 1045 include Doppler (illustrated in FIG. 4), Hadamard, PRPM, Costas (illustrated in FIG. 8), Golay, Frank, Zadoff Chu, space-time codes, and so on.

The compressed data matrices or compressed data cube may be transmitted to an external processing component, such as a different SoC or a central processing unit.

It is to be noted that the compressive multiplexing techniques disclosed herein are applicable to radar data corresponding to echoes of FMCW, OFDM, or PMCW radar transmit signals.

It can be seen from the foregoing description that the described systems, circuitries, and methods support compression of radar data so that radar data may be transmitted to a separate unit for processing.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for generating a frequency hopping radar signal according to embodiments and examples described herein.

Example 1 is a method, including storing radar data in a memory. The radar data is stored in a data cube having bins distributed in positions described by indices along dimensions including a slow-time dimension, a fast-time dimension, and a channel dimension. The data cube includes a plurality of data vectors, each data vector includes a unique set of bins, wherein bins of a data vectors have different indices in one of the slow-time dimension, the fast-time dimension, and the channel dimension and identical indices in the other two of the slow-time dimension, the fast-time dimension, and the channel dimension. The method includes dividing the data cube along a first dimension into one or more zones and then, for each zone, selecting a number of data matrices, each data matrix including data vectors having bins that share an index value in a second dimension, wherein the number is based on a compression factor, further wherein the number of data matrices selected for a first zone is different from the number of data matrices selected for a second zone; forming sets of data matrices containing the number of data matrices. For each set of data matrices, for each data matrix, the method includes coding the data vectors in the data matrix to generate a coded data matrix, wherein a coding for data vectors in a data matrix is the same and a coding for different data matrices is different and combining the coded data matrices in the set in the second dimension to generate a compressed data matrix for the zone. The compressed data matrices for the one or more zones are stored in a memory.

Example 2 includes the subject matter of example 1, wherein the compressed data cube consumes less memory space than the data cube.

Example 3 includes the subject matter of example 1, wherein coding data vectors in a data matrix includes, for each data vector, performing a Doppler Division Multiplexing (DDM) coding by shifting data samples stored in the bins of the data vector by a unique frequency.

Example 4 includes the subject matter of example 1, wherein coding data vectors in a data matrix includes, for each data vector shifting by data samples stored in the bins of the data vector based on a Costas code.

Example 5 includes the subject matter of example 1, wherein a number of data vectors in data matrices in a first zone is different from a number of data vectors in data matrices in a second zone.

Example 6 includes the subject matter of example 1, wherein the radar data includes time-domain radar amplitude data.

Example 7 includes the subject matter of example 1, wherein the radar data includes range spectrum data.

Example 8 includes the subject matter of example 1, wherein the radar data includes range Doppler spectrum data.

Example 9 includes the subject matter of example 1, further including transmitting the compressed data cube to a processing component.

Example 10 is a radar data processing system, including a memory and a coding and combining circuitry. The memory is configured to store radar data in a data cube having bins distributed in positions described by indices along dimensions including a slow-time dimension, a fast-time dimension, and a channel dimension. The data cube includes a plurality of data vectors, each data vector includes a unique set of bins, wherein bins of a data vectors have different indices in one of the slow-time dimension, the fast-time dimension, and the channel dimension and identical indices in the other two of the slow-time dimension, the fast-time dimension, and the channel dimension. The coding and combining circuitry is configured to divide the data cube along a first dimension into one or more zones and then, for each zone, select a number of data matrices, each data matrix including data vectors having bins that share an index value in a second dimension, wherein the number is based on a compression factor, further wherein the number of data matrices selected for a first zone is different from the number of data matrices selected for a second zone and form sets of data matrices containing the number of data matrices. For each set of data matrices, for each data matrix, the coding and combining circuitry is configured to code the data vectors in the data matrix to generate a coded data matrix, wherein a coding for data vectors in a data matrix is the same and a coding for different data matrices is different. and combine the coded data matrices in the set in the second dimension to generate a compressed data matrix for the zone. The coding and combining circuitry is configured to store the compressed data matrices for the one or more zones in the memory.

Example 11 includes the subject matter of example 10, wherein the compressed data cube consumes less memory space than the data cube.

Example 12 includes the subject matter of example 10, wherein the coding and combining circuitry is configured to code data vectors in a data matrix by, for each data vector, performing a Doppler Division Multiplexing (DDM) coding by shifting data samples stored in the bins of the data vector by a unique frequency.

Example 13 includes the subject matter of example 10, wherein the coding and combining circuitry is configured to code data vectors in a data matrix by, for each data vector shifting by data samples stored in the bins of the data vector based on a Costas code.

Example 14 includes the subject matter of example 10, wherein a number of data vectors in data matrices in a first zone is different from a number of data vectors in data matrices in a second zone.

Example 15 includes the subject matter of example 10, wherein the radar data includes time-domain radar amplitude data.

Example 16 includes the subject matter of example 10, wherein the radar data includes range spectrum data.

Example 17 includes the subject matter of example 10, wherein the radar data includes range Doppler spectrum data.

Example 18 includes the subject matter of example 10, wherein the coding and combining circuitry is configured to transmit the compressed data cube to a processing component.

Example 19 is coding and combining circuitry configured to read a first data vector and a second data vector stored in a data cube; apply a first coding to a first data vector to generate a first coded data vector; apply a second coding, different from the first coding, to the second data vector to generate a second coded data vector; combine the first coded data vector and the second coded data vector to generate a compressed data vector; and store the compressed data vector.

Example 20 includes the subject matter of example 19, wherein the first coding and second coding are both one of Doppler, Hadamard, PRPM, Costas, Golay, Frank, Zadoff Chu, or space-time coding.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale.

As utilized herein, terms "module", "component," "system," "circuit," "circuitry," "element," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method, comprising:
    storing radar data in a memory, the radar data being stored in a data cube having bins distributed in positions described by indices along dimensions including a slow-time dimension, a fast-time dimension, and a channel dimension;
    dividing the data cube along a first dimension into one or more zones;
    for each zone,
        selecting a number of data matrices, each data matrix comprising data vectors having bins that share an index value in a second dimension, wherein the number is based on a compression factor, further wherein the number of data matrices selected for a first zone is different from the number of data matrices selected for a second zone;
        forming sets of data matrices containing the number of data matrices;
        for each set of data matrices, for each data matrix, applying a signal processing coding scheme to data vectors in the data matrix to generate a coded data matrix, wherein a signal processing coding scheme for data vectors in a data matrix is the same and a signal processing coding scheme for different data matrices is different; and
        combining the coded data matrices in the set in the second dimension to generate a compressed data matrix for the zone; and
    storing the compressed data matrices for the one or more zones in a memory, wherein the compressed data matrices correspond to a compressed data cube.

2. The method of claim 1, wherein the compressed data cube consumes less memory space than the data cube.

3. The method of claim 1, wherein coding data vectors in a data matrix comprises, for each data vector, performing a Doppler Division Multiplexing (DDM) coding by shifting data samples stored in the bins of the data vector by a unique frequency.

4. The method of claim 1, wherein coding data vectors in a data matrix comprises, for each data vector shifting by data samples stored in the bins of the data vector based on a Costas code.

5. The method of claim 1, wherein a number of data vectors in data matrices in a first zone is different from a number of data vectors in data matrices in a second zone.

6. The method of claim 1, wherein the radar data comprises time-domain radar amplitude data.

7. The method of claim 1, wherein the radar data comprises range spectrum data.

8. The method of claim 1, wherein the radar data comprises range Doppler spectrum data.

9. The method of claim 1, further comprising transmitting the compressed data cube to a processing component.

10. A radar data processing system, comprising:
    a memory configured to store radar data in a data cube having bins distributed in positions described by indices along dimensions including a slow-time dimension, a fast-time dimension, and a channel dimension; and
    coding and combining circuitry configured to:
        divide the data cube along a first dimension into one or more zones;
        for each zone,
            select a number of data matrices, each data matrix comprising data vectors having bins that share an index value in a second dimension, wherein the number is based on a compression factor, further wherein the number of data matrices selected for a first zone is different from the number of data matrices selected for a second zone;
            form sets of data matrices containing the number of data matrices;
            for each set of data matrices, for each data matrix, apply a signal processing code to data vectors in the data matrix to generate a coded data matrix, wherein a signal processing coding scheme for data vectors in a data matrix is the same and a signal processing coding scheme for different data matrices is different; and
            combine the coded data matrices in the set in the second dimension to generate a compressed data matrix for the zone; and
        store the compressed data matrices for the one or more zones in the memory, wherein the compressed data matrices correspond to a compressed data cube.

11. The radar data processing system of claim 10, wherein the compressed data cube consumes less memory space than the data cube.

12. The radar data processing system of claim 10, wherein the coding and combining circuitry is configured to code data vectors in a data matrix by, for each data vector, performing a Doppler Division Multiplexing (DDM) coding by shifting data samples stored in the bins of the data vector by a unique frequency.

13. The radar data processing system of claim 10, wherein the coding and combining circuitry is configured to code data vectors in a data matrix by, for each data vector shifting by data samples stored in the bins of the data vector based on a Costas code.

14. The radar data processing system of claim 10, wherein a number of data vectors in data matrices in a first zone is different from a number of data vectors in data matrices in a second zone.

15. The radar data processing system of claim 10, wherein the radar data comprises time-domain radar amplitude data.

16. The radar data processing system of claim 10, wherein the radar data comprises range spectrum data.

17. The radar data processing system of claim 10, wherein the radar data comprises range Doppler spectrum data.

18. The radar data processing system of claim 10, wherein the coding and combining circuitry is configured to transmit the compressed data cube to a processing component.

19. Coding and combining circuitry configured to:
- read a first data vector and a second data vector stored in a data cube;
- apply a first signal processing coding scheme to a first data vector to generate a first coded data vector;
- apply a second signal processing coding scheme, different from the first signal processing coding scheme, to the second data vector to generate a second coded data vector;
- combine the first coded data vector and the second coded data vector to generate a compressed data vector; and
- store the compressed data vector.

20. The coding and combining circuitry of claim 19, wherein the first coding and second coding are both one of Doppler, Hadamard, PRPM, Costas, Golay, Frank, Zadoff Chu, or space-time coding.

* * * * *